US012800320B2

(12) United States Patent
Inoue

(10) Patent No.: US 12,800,320 B2
(45) Date of Patent: Nov. 17, 2026

(54) DETERMINATION DEVICE, DETERMINATION METHOD, AND STORAGE MEDIUM

(71) Applicant: HONDA MOTOR CO., LTD., Tokyo (JP)

(72) Inventor: Daichi Inoue, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/059,633

(22) Filed: Feb. 21, 2025

(65) Prior Publication Data

US 2025/0283724 A1 Sep. 11, 2025

(30) Foreign Application Priority Data

Mar. 8, 2024 (JP) ................................ 2024-035552

(51) Int. Cl.
*G01C 21/30* (2006.01)
*G06V 20/56* (2022.01)
*G06V 20/58* (2022.01)

(52) U.S. Cl.
CPC ............. *G01C 21/30* (2013.01); *G06V 20/58* (2022.01); *G06V 20/588* (2022.01); *G06V 2201/08* (2022.01)

(58) Field of Classification Search
CPC ....... G06V 20/58; G06V 20/588; G01C 21/30
See application file for complete search history.

(56) References Cited

U.S. PATENT DOCUMENTS

2020/0064138 A1* 2/2020 Takahama .............. G01C 21/30
2022/0063615 A1* 3/2022 Tamura ............. B60W 60/0053
2023/0303099 A1 9/2023 Inoue et al.
2024/0051529 A1 2/2024 Inoue et al.

FOREIGN PATENT DOCUMENTS

JP 2022-039469 3/2022
JP 2023-139737 10/2023
JP 2023-148405 10/2023
JP 2024-025482 2/2024

OTHER PUBLICATIONS

Japanese Office Action for Japanese Patent Application No. 2024-035552 mailed Dec. 2, 2025.

* cited by examiner

*Primary Examiner* — Luke Huynh
(74) *Attorney, Agent, or Firm* — Amin, Turocy & Watson, LLP

(57) ABSTRACT

A determination device of an embodiment includes a first recognizer configured to recognize a surrounding situation including first demarcation lines that demarcate a traveling lane of a subject vehicle and neighboring vehicles present around the subject vehicle based on an output of a detection device, a second recognizer configured to recognize second demarcation lines that demarcate lanes around the subject vehicle from map information based on position information of the subject vehicle, and a determiner configured to determine whether or not there is a deviation between the first demarcation lines and the second demarcation lines, wherein the determiner varies the manner of determining whether or not there is a deviation between the first demarcation lines and the second demarcation lines between a case in which the neighboring vehicles have been recognized by the first recognizer and a case in which the neighboring vehicles have not been recognized.

13 Claims, 6 Drawing Sheets

DETERMINATION DEVICE, DETERMINATION METHOD, AND STORAGE MEDIUM

CROSS-REFERENCE TO RELATED APPLICATION

Priority is claimed on Japanese Patent Application No. 2024-035552, filed Mar. 8, 2024, the content of which is incorporated herein by reference.

BACKGROUND

Field of the Invention

The present invention relates to a determination device, a determination method, and a storage medium.

Description of Related Art

In recent years, attempts to provide access to a sustainable transportation system that takes into consideration vulnerable traffic participants have been gaining momentum. To achieve this, efforts are being made to further improve traffic safety and convenience through research and development of automated driving technology. In relation to this, technology is known that, when it is determined that there is a discrepancy between a road demarcation line (camera demarcation line) shown in a camera image and a road demarcation line (map demarcation line) shown in map information, controls a driving mode of a vehicle on the basis of parallelism between driving trajectories of other vehicles in the vicinity and camera demarcation lines (for example, Japanese Unexamined Patent Application, First Publication No. 2023-148405).

SUMMARY

However, in conventional automated driving technology, when the driving trajectory of an adjacent vehicle traveling parallel to a subject vehicle in an adjacent lane of the subject vehicle is used, the timing of change in trajectory is delayed compared to the driving trajectory of a preceding vehicle traveling in front of the subject vehicle, and thus there is a possibility that the timing of determination of whether or not camera demarcation lines are correct may be delayed. Conventionally, there are cases where camera demarcation lines cannot be recognized at a long distance, and thus the camera demarcation lines cannot be compared with trajectories of other vehicles at a long distance, and similarly, there is a possibility of delaying determination of whether or not the camera demarcation lines are correct.

In order to solve the above problem, an object of the present application is to provide a determination device, a determination method, and a storage medium capable of more appropriately determining whether or not demarcation lines are correct depending on the situation of road demarcation lines around a subject vehicle and neighboring vehicles. This will ultimately contribute to the development of a sustainable transportation system.

The determination device, determination method, and storage medium of the present invention adopt the following configurations.

(1): A determination device according to one aspect of the present invention is a determination device including a first recognizer configured to recognize a surrounding situation including first demarcation lines that demarcate a traveling lane of a subject vehicle and neighboring vehicles present around the subject vehicle on the basis of an output of a detection device that detects the surrounding situation of the subject vehicle, a second recognizer configured to recognize second demarcation lines that demarcate lanes around the subject vehicle from map information on the basis of position information of the subject vehicle, and a determiner configured to determine whether or not there is a deviation between the first demarcation lines and the second demarcation lines, wherein the determiner varies the manner of determining whether or not there is a deviation between the first demarcation lines and the second demarcation lines between a case in which the neighboring vehicles have been recognized by the first recognizer and a case in which the neighboring vehicles have not been recognized.

(2): In the aspect of (1), the neighboring vehicles include an adjacent vehicle traveling in an adjacent lane adjacent to the lane in which the subject vehicle is traveling and present within a predetermined distance from the subject vehicle, and the determiner varies the manner of the determination when the neighboring vehicles include an adjacent vehicle.

(3): In the aspect of (1), the determiner is likely to determine that there is a deviation between the first demarcation lines and the second demarcation lines when the neighboring vehicles have been recognized than when the neighboring vehicles have not been recognized.

(4): in the aspect of (2), when the neighboring vehicles have been recognized by the first recognizer, the determiner determines whether or not there is a deviation between the first demarcation lines and the second demarcation lines on the basis of a driving trajectory of a neighboring vehicle other than the adjacent vehicle among the recognized neighboring vehicles and present ahead of the adjacent vehicle in a traveling direction, and the second demarcation lines.

(5): In the aspect of (4), the determiner sets virtual first demarcation lines from the driving trajectory of the neighboring vehicle and determines whether or not there is a deviation between the set virtual first demarcation lines and the second demarcation lines.

(6): In the aspect of (2), when the neighboring vehicles have been recognized by the first recognizer, the determiner determines whether or not there is a deviation between the first demarcation lines and the second demarcation lines at a position less than a predetermined distance from the subject vehicle, and determines whether or not there is a deviation between the second demarcation lines and a driving trajectory of a neighboring vehicle other than an adjacent vehicle among the neighboring vehicles and ahead of the adjacent vehicle at a position equal to or greater than the predetermined distance from the subject vehicle.

(7): In the aspect of (5), the determiner determines whether or not there is a deviation between the virtual first demarcation lines and the second demarcation lines at a position equal to or greater than the predetermined distance from the subject vehicle.

(8): In the aspect of (2), after determining whether or not there is a deviation between the first demarcation lines and the second demarcation lines using the neighboring vehicles, the determiner resets a result of determination of whether there is a deviation when the first recognizer no longer recognizes the adjacent vehicle.

(9): In the aspect of (4), the determiner acquires a driving trajectory of a neighboring vehicle in which a deviation angle of the driving trajectory with respect to an extension direction of the second demarcation lines is equal to or greater than a predetermined angle, and determines whether or not there is a deviation between the acquired driving trajectory and the second demarcation lines.

(10): In the aspect of (4), the determiner acquires deviation directions of driving trajectories of the neighboring vehicles with respect to an extension direction of the second demarcation lines, and determines whether or not there is a deviation between a driving trajectory with a greater number of identical deviation directions and the second demarcation lines.

(11): In the aspect of (4), the determiner acquires deviation directions of the driving trajectories of the neighboring vehicles with respect to an extension direction of the second demarcation lines, and does not determine whether or not there is a deviation between the driving trajectories of the neighboring vehicles and the second demarcation lines if a number of driving trajectories with the same deviation direction is identical in a plurality of different directions.

(12): A determination method according to one aspect of the present invention is a determination method, using a computer, including recognizing a surrounding situation including first demarcation lines that demarcate a traveling lane of a subject vehicle and neighboring vehicles present around the subject vehicle on the basis of an output of a detection device that detects the surrounding situation of the subject vehicle, recognizing second demarcation lines that demarcate lanes around the subject vehicle from map information on the basis of position information of the subject vehicle, determining whether or not there is a deviation between the first demarcation lines and the second demarcation lines, and varying the manner of determining whether or not there is a deviation between the first demarcation lines and the second demarcation lines between a case in which the neighboring vehicles have been recognized and a case in which the neighboring vehicles have not been recognized.

(13): A storage medium according to one aspect of the present invention is a computer-readable non-transitory storage medium storing a program of causing a computer to recognize a surrounding situation including first demarcation lines that demarcate a traveling lane of a subject vehicle and neighboring vehicles present around the subject vehicle on the basis of an output of a detection device that detects the surrounding situation of the subject vehicle, recognize second demarcation lines that demarcate lanes around the subject vehicle from map information on the basis of position information of the subject vehicle, determine whether or not there is a deviation between the first demarcation lines and the second demarcation lines, and vary the manner of determining whether or not there is a deviation between the first demarcation lines and the second demarcation lines between a case in which the neighboring vehicles have been recognized and a case in which the neighboring vehicles have not been recognized.

According to the above aspects of (1) to (13), it is possible to determine whether or not demarcation lines are correct more appropriately depending on the situation of road demarcation lines around a subject vehicle and neighboring vehicles.

DESCRIPTION OF EMBODIMENTS

Hereinafter, an embodiment of a determination device, a determination method, and a storage medium of the present invention will be described with reference to the drawings. As an example, an embodiment in which a vehicle control device including a determination device that determines whether or not a road demarcation line (or lane) that demarcates a lane in which a subject vehicle is traveling is a correct demarcation line (or lane) is applied to an automated vehicle will be described below. Automated driving is, for example, automatically controlling one or both of steering and speed of a vehicle to perform driving control. The aforementioned driving control may include, for example, an adaptive cruise control system (ACC), a traffic jam pilot (TJP), a lane keeping assistance system (LKAS), an automated lane change (ALC), a collision mitigation brake system (CMBS), and the like. An automated vehicle may be driven by manual operation of a user of the vehicle (for example, an occupant) (so-called manual driving). Hereinafter, a case where the law of driving on the left side is applied will be described, but if the law of driving on the right side is applied, the left and right may be read in reverse.

Overall Configuration

Figure 1:
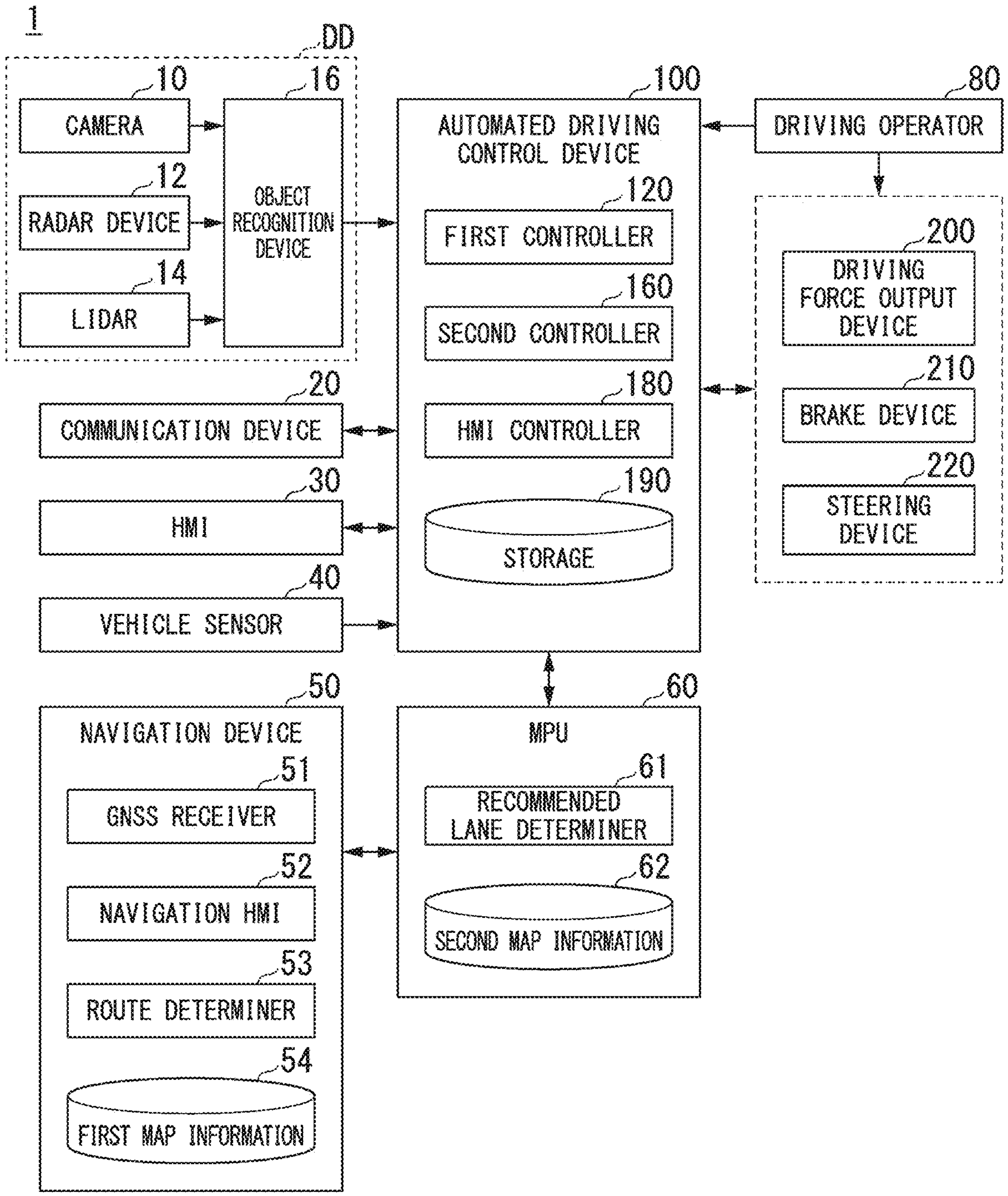
FIG. 1 is a configuration diagram of a vehicle system including a vehicle control device according to an embodiment.

FIG. 1 is a configuration diagram of a vehicle system 1 including a vehicle control device according to an embodiment. A vehicle equipped with the vehicle system 1 (hereinafter referred to as a subject vehicle M) is, for example, a two-wheeled, three-wheeled, four-wheeled vehicle, or the like and the driving source thereof is an internal combustion engine such as a diesel engine or a gasoline engine, an electric motor, or a combination thereof. The electric motor operates using power generated by a generator connected to the internal combustion engine, or discharged power from a battery (storage battery) such as a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automated driving control device 100, a driving force output device 200, a brake device 210, and a steering device 220. These devices and equipment are connected to each other through multiple communication lines such as controller area network (CAN) communication lines, a serial communication line, a wireless communication network, or the like. The configuration shown in FIG. 1 is merely an example, and a part of the configuration may be omitted, or another configuration may be added. A combination of the camera 10, the radar device 12, the LIDAR 14, and the object recognition device 16 is an example of a "detection device DD." The HMI 30 is an example of an "output device." The automated driving control device 100 is an example of a "vehicle control device."

The camera 10 is, for example, a digital camera using a solid-state imaging element such as a charge coupled device (CCD) or a complementary metal oxide semiconductor (CMOS). The camera 10 is attached to any location of the subject vehicle M equipped with the vehicle system 1. When capturing a front view image, the camera 10 is attached to the top of the front windshield, the back of the room mirror, the front of the vehicle body, and the like. When capturing a rear view image, the camera 10 is attached to the top of the rear windshield, a back door, and the like. When capturing a side view image, the camera 10 is attached to a door mirror and the like. The camera 10 periodically and repeatedly captures images of the surroundings of the subject vehicle M, for example. The camera 10 may be a stereo camera.

The radar device 12 emits radio waves such as millimeter waves around the subject vehicle M and detects radio waves (reflected waves) reflected by surrounding objects to detect at least the position (distance and direction) of an object. The radar device 12 is attached to an arbitrary location of the subject vehicle M. The radar device 12 may detect the position and speed of an object by a frequency modulated continuous wave (FM-CW) method.

The LIDAR 14 radiates light around the subject vehicle M and measures scattered light. The LIDAR 14 detects a distance to a target on the basis of the time from light emission to light reception. The radiated light is, for example, pulsed laser light. The LIDAR 14 is attached to an arbitrary location of the subject vehicle M.

The object recognition device 16 performs sensor fusion processing on detection results from some or all of the camera 10, the radar device 12, and the LIDAR 14 to recognize the position, type, speed, and the like of an object. The object recognition device 16 outputs a recognition result to the automated driving control device 100. The object recognition device 16 may output detection results of the camera 10, the radar device 12, and the LIDAR 14 directly to the automated driving control device 100. In that case, the object recognition device 16 may be omitted from the configuration of the vehicle system 1 (detection device DD).

The communication device 20 communicates with, for example, other vehicles present in the vicinity of the subject vehicle M, a terminal device of a user using the subject vehicle M, or various server devices by using a network such as a cellular network, a Wi-Fi network, Bluetooth (registered trademark), dedicated short range communication (DSRC), a local area network (LAN), a wide area network (WAN), or the Internet.

The HMI 30 outputs various types of information to an occupant of the subject vehicle M and receives an input operation performed by the occupant. The HMI 30 includes, for example, various display devicees devices, a speaker, a buzzer, a touch panel, a switch, a key, a microphone, and the like.

The vehicle sensor 40 includes a vehicle speed sensor that detects the speed of the subject vehicle M, an acceleration sensor that detects an acceleration, a yaw rate sensor that detects a yaw rate (for example, a rotational angular velocity around a vertical axis passing through the center of gravity of the subject vehicle M), a direction sensor that detects the direction of the subject vehicle M, and the like. The vehicle sensor 40 may be provided with a position sensor that detects the position of the vehicle. The position sensor is an example of a "position measurer." The position sensor is, for example, a sensor that acquires position information (longitude and latitude information) from a global positioning system (GPS) device. The position sensor may be a sensor that acquires position information using a global navigation satellite system (GNSS) receiver 51 of the navigation device 50. The vehicle sensor 40 may derive the speed of the subject vehicle M from the difference (i.e., distance) of position information at a predetermined time in the position sensor. The result detected by the vehicle sensor 40 is output to the automated driving control device 100.

The navigation device 50 includes, for example, the GNSS receiver 51, a navigation HMI 52, and a route determiner 53. The navigation device 50 holds first map information 54 in a storage device such as a hard disk drive (HDD) or a flash memory. The GNSS receiver 51 identifies the position of the subject vehicle M on the basis of signals received from a GNSS satellite. The position of the subject vehicle M may be identified or complemented by an inertial navigation system (INS) that uses the output of the vehicle sensor 40. The navigation HMI 52 includes a display device, a speaker, a touch panel, keys, and the like. The GNSS receiver 51 may be provided in the vehicle sensor 40. The navigation HMI 52 may be partially or entirely common to the HMI 30 described above. The route determiner 53 determines, for example, a route (hereinafter, a route on a map) from the position of the subject vehicle M specified by the GNSS receiver 51 (or any input position) to a destination input by the occupant using the navigation HMI 52 with reference to the first map information 54. The first map information 54 is, for example, information in which a road shape is represented by links indicating roads and nodes connected by the links. The first map information 54 may include point of interest (POI) information and the like. The route on the map is output to the MPU 60. The navigation device 50 may perform route guidance using the navigation HMI 52 on the basis of the route on the map. The navigation device 50 may transmit the current position and the destination to a navigation server via the communication device 20 and obtain a route equivalent to the route on the map from the navigation server. The navigation device 50 outputs the determined route on the map to the MPU 60.

The MPU 60 includes, for example, a recommended lane determiner 61, and holds second map information 62 in a storage device such as an HDD or a flash memory. The recommended lane determiner 61 divides the route on the map provided by the navigation device 50 into a plurality of blocks (for example, every 100 [m] in the vehicle travel direction), and determines a recommended lane for each block with reference to the second map information 62. The recommended lane determiner 61 determines, for example, which lane from the left to use. If there is a branch on the route on the map, the recommended lane determiner 61 determines a recommended lane such that the subject vehicle M can travel on a reasonable route to the branch destination.

The second map information 62 is map information with higher accuracy than the first map information 54. The second map information 62 includes, for example, the number of lanes, the type and shape of road demarcation lines (hereinafter referred to as demarcation lines), information on the center of a lane, information on road boundaries, and the like. The second map information 62 may include information on whether a road boundary includes a structure impassable to vehicles (including crossing and contacting). The structure may be, for example, a guardrail, a curb, a median strip, a fence, or the like. The impassability may include the presence of a low step that allows passage if vibration of a vehicle that does not normally occur is tolerated. The second map information 62 may include road shape information, traffic regulation information, address information (address and zip code), facility information, parking lot information, telephone number information, and the like. The road shape information may be, for example, the curvature (which may be replaced with as a radius of curvature. The same applies below), width, gradient, and the like of the road. The second map information 62 may be updated (renewed) at any time by the communication device 20 communicating with an external device. The first map information 54 and the second map information 62 may be provided as an integrated piece of map information. The map information may be stored in a storage 190.

The driving operator 80 includes, for example, a steering wheel, an accelerator pedal, and a brake pedal. The driving operator 80 may also include a shift lever, a special steering wheel, a joystick, and other operators. An operation detector that detects, for example, the amount of operation of the operator by the occupant or the presence or absence of operation is provided in each operator of the driving operator 80. The operation detector detects, for example, the steering angle and steering torque of the steering wheel, the amount of depression of the accelerator pedal and the brake pedal, and the like. The operation detector then outputs detection results to the automated driving control device 100 or one or all of the driving force output device 200, the brake device 210, and the steering device 220.

The automated driving control device 100 executes various types of driving control related to automated driving for the subject vehicle M. The automated driving control device 100 includes, for example, a first controller 120, a second controller 160, an HMI controller 180, and the storage 190. The first controller 120, the second controller 160, and the HMI controller 180 are each realized by, for example, a hardware processor such as a central processing unit (CPU) executing a program (software). Some or all of these components may be realized by hardware (circuit including circuitry) such as large scale integration (LSI), an application specific integrated circuit (ASIC), a field-programmable gate array (FPGA), a graphics processing unit (GPU), or a system on chip (SOC), or may be realized by software and hardware in cooperation. The aforementioned programs may be stored in advance in a storage device (a storage device including a non-transitory storage medium) such as an HDD or a flash memory of the automated driving control device 100 or may be stored in a removable storage medium such as a DVD, a CD-ROM, or memory card, and may be installed in the storage device of the automated driving control device 100 by inserting the storage medium (non-transitory storage medium) into a drive device, a card slot, or the like.

The storage 190 may be realized by the aforementioned various storage devices, or an electrically erasable programmable read only memory (EEPROM), a read only memory (ROM), a random access memory (RAM), or the like. In the storage 190, for example, various types of information, programs, and the like in the embodiment are stored. In the storage 190, map information (for example, the first map information 54 and the second map information 62) may be stored.

Figure 2:
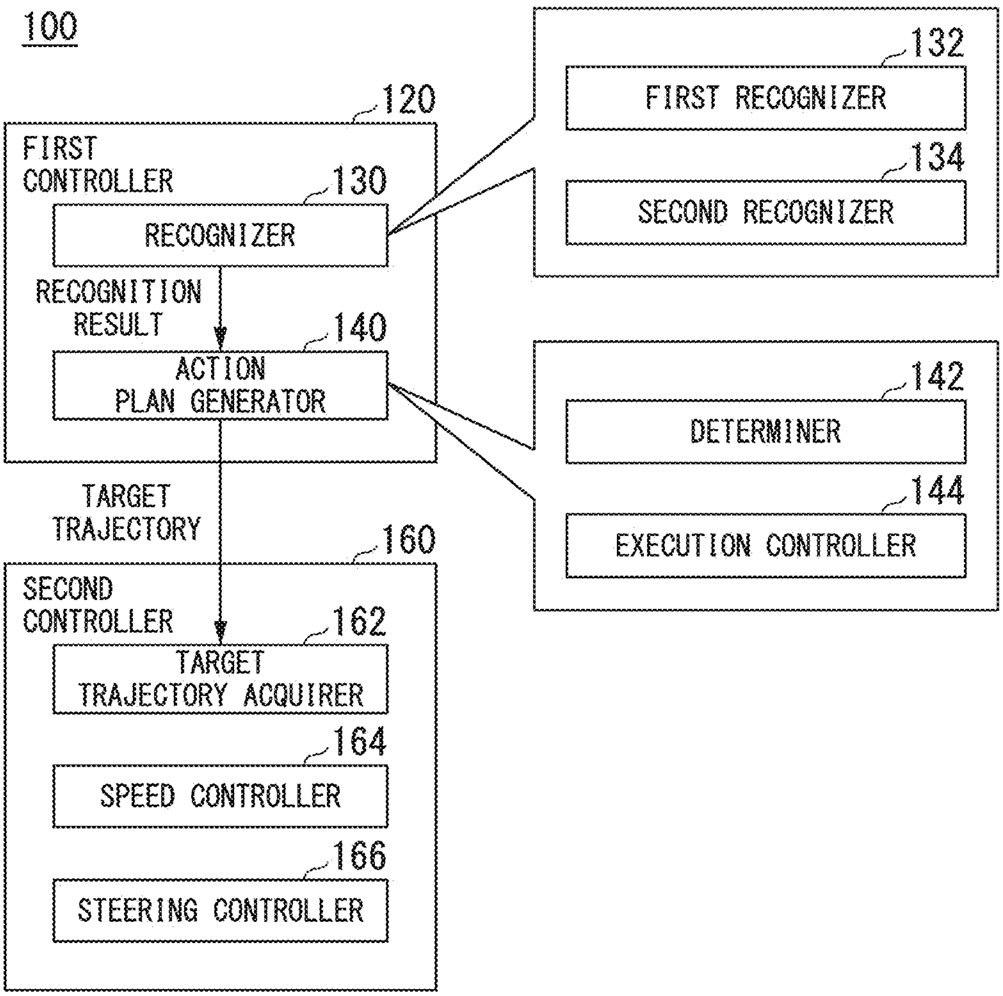
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. The first controller 120 realizes, for example, functions by artificial intelligence (AI) and functions by a model provided in advance in parallel. For example, a function of "recognizing an intersection" may be realized by executing recognition of an intersection by deep learning or the like and recognition based on conditions provided in advance (a signal, road demarcation line, and the like that can be pattern matched) in parallel, and scoring and comprehensively evaluating both. This ensures the reliability of automated driving. The first controller 120 executes control related to automated driving of the subject vehicle M on the basis of instructions from the MPU 60, the HMI controller 180, and the like, for example.

The recognizer 130 recognizes the surrounding situation of the subject vehicle M on the basis of recognition result of the detection device DD (information input from the camera 10, the radar device 12, and the LIDAR 14 via the object recognition device 16). For example, the recognizer 130 recognizes the states of the positions, speeds, accelerations, and the like of objects present around the subject vehicle M (within a predetermined distance). The objects include, for example, other vehicles (neighboring vehicles), traffic participants (pedestrians, bicycles, and the like) passing through roads, road structures, obstacles present in the surroundings, and the like. The road structures include, for example, road signs, traffic signals, railroad crossings, curbs, median strips, guardrails, fences, and the like. The position of an object is recognized as a position on absolute coordinates with a representative point (center of gravity, center of drive shaft, or the like) of the subject vehicle M as the origin, and is used for control. The position of an object may be represented by a representative point such as the center of gravity or a corner of the object, or may be represented by a represented area. The "state" of an object may include, for example, an acceleration or jerk of a mobile object, or the "action state" (for example, whether another vehicle is changing lanes or about to change lanes) when the object is the mobile object such as another vehicle.

The recognizer 130 includes, for example, a first recognizer 132 and a second recognizer 134. Details of these functions will be described later.

The action plan generator 140 generates an action plan for driving the subject vehicle M by automated driving on the basis of recognition results of the recognizer 130, and the like. For example, the action plan generator 140 generates a target trajectory for the subject vehicle M to travel in a recommended lane determined by the recommended lane determiner 61 in principle, and further travel automatically (without relying on the operation of a driver) in the future such that the subject vehicle M can respond to the surrounding situation of the subject vehicle M on the basis of recognition results of the recognizer 130 and the surrounding road shape based on the current position of the subject vehicle M acquired from map information. The target trajectory includes, for example, a speed element. For example, the target trajectory is represented as a sequence of points (trajectory points) to be reached by the subject vehicle M. The trajectory points are points to be reached by the subject vehicle M at each predetermined travel distance (e.g., about several meters) along a road, and separately, a target speed and a target acceleration are generated as parts of the target trajectory at each predetermined sampling time (e.g., about a few tenths of a second). The trajectory points may be positions to be reached by the subject vehicle M at each predetermined sampling time for each predetermined sampling time. In this case, information on the target speed and the target acceleration is represented as an interval between the trajectory points.

The action plan generator 140 may set an event for automatic driving when generating the target trajectory. The event may include, for example, a constant speed driving event in which the subject vehicle M travels in the same lane at a constant speed, a following driving event in which the subject vehicle M follows another vehicle that is within a predetermined distance (for example, within 100 [m]) ahead of the subject vehicle M and is closest to the subject vehicle M, a lane change event in which the subject vehicle M changes lanes from the subject vehicle's lane to an adjacent lane, a branching event in which the subject vehicle M branches into a lane on a destination side at a branching point on a road, a merging event in which the subject vehicle M merges into a main lane at a merging point, a takeover event for terminating automated driving and switching to manual driving, and the like. The event may include, for example, an overtaking event in which the subject vehicle M changes lanes to an adjacent lane once, overtakes a preceding vehicle in the adjacent lane, and then changes lanes back to the original lane, an avoidance event in which the subject vehicle M performs at least one of braking and steering to avoid an obstacle ahead of the subject vehicle M, and the like.

The action plan generator 140 may change an event already determined for the current section to another event or set a new event for the current section, depending on the surrounding situation of the subject vehicle M recognized while the subject vehicle M is traveling. The action plan generator 140 may change an event already set for the current section to another event or set a new event for the current section, depending on the operation of the occupant on the HMI 30. The action plan generator 140 generates a target trajectory according to a set event.

The action plan generator 140 includes, for example, a determiner 142 and an execution controller 144. Details of these functions will be described later. For example, the recognizer 130 and the determiner 142 are an example of a "determination device." The execution controller 144 and the second controller 160 are an example of a "driving controller."

The second controller 160 controls the driving force output device 200, the brake device 210, and the steering device 220 such that the subject vehicle M passes the target trajectory generated by the action plan generator 140 at a scheduled time.

The second controller 160 includes, for example, a target trajectory acquirer 162, a speed controller 164, and a steering controller 166. The target trajectory acquirer 162 acquires information on the target trajectory (trajectory points) generated by the action plan generator 140 and stores the same in a memory (not shown). The speed controller 164 controls the driving force output device 200 or the brake device 210 on the basis of a speed element associated with the target trajectory stored in the memory. The steering controller 166 controls the steering device 220 depending on the degree of curve of the target trajectory stored in the memory. Processing of the speed controller 164 and the steering controller 166 is realized, for example, by a combination of feedforward control and feedback control. As an example, the steering controller 166 executes a combination of feedforward control depending on the curvature of the road ahead of the subject vehicle M and feedback control based on a deviation from the target trajectory.

Referring back to FIG. 1, the HMI controller 180 notifies the occupant of predetermined information via the HMI 30. The predetermined information includes, for example, information related to traveling of the subject vehicle M, such as information related to the state of the subject vehicle M and information related to driving control. The information related to the state of the subject vehicle M includes, for example, the speed, engine speed, shift position, and the like of the subject vehicle M. The information related to driving control includes, for example, whether or not driving control is being performed by automated driving, information for inquiring whether or not automated driving will be started, information related to a driving control situation by automated driving, information related to an automation level, information for prompting the occupant to drive when switching from automated driving to manual driving, and the like. The predetermined information may include information unrelated to traveling of the subject vehicle M, such as television programs, and content (for example, movies) stored in a storage medium such as a DVD. The predetermined information may include, for example, a current position or a destination in automated driving, and information regarding the remaining amount of fuel in the subject vehicle M. The HMI controller 180 may output the information received through the HMI 30 to the communication device 20, the navigation device 50, the first controller 120, and the like.

The HMI controller 180 may output inquiry information for the occupant, processing results of the first controller 120 and the second controller 160, and the like to the HMI 30. The HMI controller 180 may transmit various types of information output by the HMI 30 to a terminal device used by the user of the subject vehicle M via the communication device 20.

The driving force output device 200 outputs driving force (torque) for the vehicle to travel to the driving wheels. The driving force output device 200 includes, for example, a combination of an internal combustion engine, an electric motor, and a transmission, and an electronic control unit (ECU) that controls the same. The ECU controls the aforementioned components according to information input from the second controller 160 or information input from the accelerator pedal of the driving operator 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the second controller 160 or information input from the brake pedal of the driving operator 80 such that a brake torque according to the braking operation is output to each vehicle wheel. The brake device 210 may include a backup mechanism that transmits hydraulic pressure generated by the operation of the brake pedal to the cylinder via a master cylinder. The brake device 210 is not limited to the configuration described above, and may be an electronically controlled hydraulic brake device that controls an actuator according to information input from the second controller 160 and transmits hydraulic pressure from the master cylinder to the cylinder.

The steering device 220 includes, for example, a steering ECU and an electric motor. The electric motor applies a force to a rack and pinion mechanism, for example, to change the direction of steered wheels. The steering ECU drives the electric motor in accordance with information input from the second controller 160 or information input from the steering wheel of the driving operator 80 to change the direction of the steered wheels.

Recognizer and Action Plan Generator

Next, the functions of the recognizer 130 (first recognizer 132 and second recognizer 134) and the action plan generator 140 (determiner 142 and execution controller 144) will be described in detail. In the following, the content of driving control (travel control) based on determination processing and determination control in the embodiment will be mainly described in several scenes.

First Scene

Figure 3:
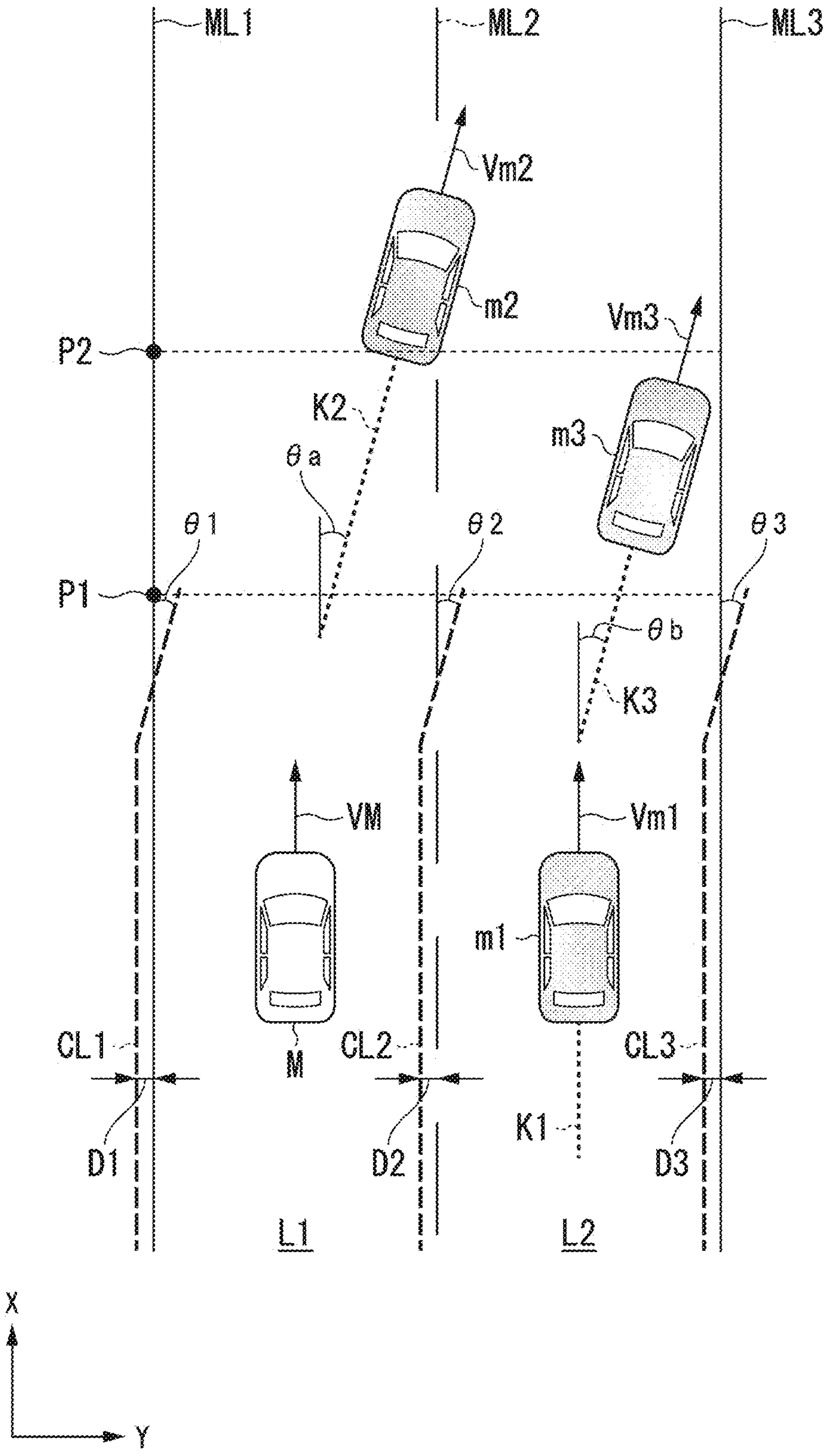
FIG. 3 is a diagram illustrating determination processing and driving control of the subject vehicle M in a first scene.

FIG. 3 is a diagram illustrating determination processing and driving control of the subject vehicle M in the first scene. The example of FIG. 3 shows demarcation lines CL1 to CL3 recognized by the detection device DD and demarcation lines ML1 to ML3 obtained from map information (e.g., the second map information 62) on the basis of position information of the subject vehicle M. In the map information, a lane L1 is demarcated by demarcation lines ML1 and ML2, and a lane L2 is demarcated by demarcation lines ML2 and ML3. The lanes L1 and L2 are lanes in which vehicles can travel in the same direction (X-axis direction in the figure). In the example of FIG. 3, the demarcation lines CL1 to CL3 are an example of a "first demarcation line" and the demarcation lines ML1 to ML3 are an example of a "second demarcation line." In FIG. 3, it is assumed that the subject vehicle M travels in the lane L1 at a speed VM, and another vehicle m1 travels in the lane L2, which is an adjacent lane to the lane L1, at a speed Vm1. The other vehicle m1 is an adjacent vehicle with respect to the subject vehicle M. The adjacent vehicle is, for example, a vehicle traveling (traveling parallel) in an adjacent lane that is adjacent to the lane in which the subject vehicle travels. In addition, the adjacent vehicle may be a vehicle that is present within a predetermined distance from the subject vehicle M. In the example of FIG. 3, the subject vehicle M is assumed to be performing predetermined driving control (e.g., LKAS) on the basis of the surrounding situation, instructions from the occupant, and the like. In the example of FIG. 3, it is assumed that another vehicle m2 is traveling at a speed Vm2 and another vehicle m3 is traveling at a speed Vm3 ahead of the subject vehicle M (and the other vehicle m1).

The first recognizer 132 recognizes the surrounding situation of the subject vehicle M on the basis of the output of the detection device DD that detects the surrounding situation (external environment) of the subject vehicle M. For example, the first recognizer 132 recognizes the left and right demarcation lines CL1 and CL2 that demarcate the traveling lane (lane L1) of the subject vehicle M on the basis of images captured by the camera 10 (hereinafter, camera images). The first recognizer 132 may recognize the demarcation line CL3 that demarcates the adjacent lane (lane L2) that is adjacent to the traveling lane. Hereinafter, the demarcation lines CL1 to CL3 may be referred to as "camera demarcation lines CL1 to CL3." For example, the first recognizer 132 analyzes a camera image, extracts edge points in the image that have large brightness differences from adjacent pixels, and recognizes the camera demarcation lines CL1 to CL3 in the image plane by connecting the edge points. The first recognizer 132 converts the positions of the camera demarcation lines CL1 to CL3 into a vehicle coordinate system (for example, the XY plane coordinates in FIG. 3) on the basis of the position of the representative point of the subject vehicle M. The first recognizer 132 may recognize, for example, the curvatures of the camera demarcation lines CL1 to CL3. The first recognizer 132 may recognize the amounts of changes in the curvatures of the camera demarcation lines CL1 to CL3. The amounts of changes in the curvatures are, for example, rates of change over time of the curvatures of the camera demarcation lines CL1 to CL3 recognized by the camera 10 at a distance x [m] forward as viewed from the subject vehicle M. The first recognizer 132 may average the curvatures or the amounts of changes in the curvatures of the camera demarcation lines CL1 to CL3 to recognize the curvature or the amount of change in the curvature of the lane demarcated by the camera demarcation lines CL1 to CL3. The camera demarcation lines CL1 to CL3 may be recognized or corrected on the basis of the output of a detection device (for example, the radar device 12 or the LIDAR 14) other than the camera 10.

The first recognizer 132 recognizes other vehicles (neighboring vehicles) present around the subject vehicle M (within a predetermined distance). In the example of FIG. 3, the first recognizer 132 recognizes the other vehicle (adjacent vehicle) m1 traveling parallel to the subject vehicle M in the adjacent lane and the other vehicles (preceding vehicles) m2 and m3 traveling ahead of the subject vehicle M on the basis of the output of the detection device DD that detects the surrounding situation of the subject vehicle M. The first recognizer 132 recognizes the position (relative position with respect to the subject vehicle M) and speed (relative speed with respect to the subject vehicle M) of each of the other vehicles m1 to m3, and recognizes traveling lanes, vehicle body orientations, traveling directions, and the like of the other vehicles m1 to m3. The first recognizer 132 may recognize traveling position information of the other vehicles m1 to m3. The traveling position information is, for example, traveling trajectories K1 to K3 based on traveling positions of reference positions (for example, centers or centers of gravity) of the other vehicles m1 to m3 at a predetermined time.

The second recognizer 134 recognizes demarcation lines that demarcate lanes around the subject vehicle M from map information on the basis of the position of the subject vehicle M detected by the vehicle sensor 40 or the GNSS receiver 51, for example. For example, the second recognizer 134 refers to the map information on the basis of the position information of the subject vehicle M, and recognizes the demarcation lines ML1 to ML3 present in the traveling direction of the subject vehicle M or in a direction in which the subject vehicle M can travel. Hereinafter, the demarcation lines ML1 to ML3 may be referred to as "map demarcation lines ML1 to ML3."

The second recognizer 134 may recognize the map demarcation lines ML1 and ML2 as demarcation lines that demarcate the lane L1 in which the subject vehicle M is traveling, among the recognized map demarcation lines ML1 to ML3. The second recognizer 134 recognizes the curvature or the amount of change in the curvature of each of the map demarcation lines ML1 to ML3 from the second map information 62. The second recognizer 134 may recognize the curvature or the amount of change in the curvature of the lane defined by the map demarcation lines by averaging the curvatures or the amounts of changes in the curvatures of the map demarcation lines ML1 to ML3.

The determiner 142 determines whether there is a deviation between the camera demarcation lines CL1 to CL3 recognized by the first recognizer 132 and the map demarcation lines ML1 to ML3 recognized by the second recognizer 134. For example, the determiner 142 derives the degree of deviation between the demarcation lines CL1 and ML1 located closest to the left side of the subject vehicle M, the degree of deviation between the demarcation lines CL2 and ML2 located closest to the right side of the subject vehicle M, and the degree of deviation between the demarcation lines CL3 and ML3 on the adjacent lane side. Then, the determiner 142 determines that there is a deviation between the camera demarcation lines and the map demarcation lines when the derived deviation degrees are equal to or greater than a threshold value, and determines that there is no deviation when the derived deviation degrees are less than the threshold value. The aforementioned deviation determination is repeatedly performed at a predetermined timing or cycle.

For example, the determiner 142 superimposes the camera demarcation lines CL1, CL2, and CL3 and also superimposes the map demarcation lines ML1, ML2, and ML3 on the plane of the vehicle coordinate system (XY plane) on the basis of the position of the representative point of the subject vehicle M. Then, when determining the demarcation lines to be compared (demarcation lines CL1 and ML1, demarcation lines CL2 and ML2, and demarcation lines CL3 and ML3), the determiner 142 determines that there is a deviation between the demarcation lines when the degree of deviation of each demarcation line is equal to or greater than the threshold value, and determines that there is no deviation when the degree of deviation is less than the threshold value. The degree of deviation is, for example, the degree of deviation amount in lateral position (for example, in the Y-axis direction in the figure). In the example of FIG. 3, the deviation determination may be performed using an average value of a deviation amount D1 of the demarcation lines CL1 and ML1 in the lateral position, a deviation amount D2 of the demarcation lines CL2 and ML2 in the lateral position, and a deviation amount D3 of the demarcation lines CL3 and ML3 in the lateral position, or the deviation determination may be performed using the maximum or minimum value of the deviation amounts D1, D2, and D3.

The degree of deviation may be, for example, the degree (magnitude) of the angle formed by two demarcation lines to be compared, instead of (or in addition to) the amount of lateral deviation described above. In the example of FIG. 3, the average value of the angle θ1 formed by the demarcation lines CL1 and ML1, the angle θ2 formed by the demarcation lines CL2 and ML2, and the angle θ3 formed by the demarcation lines CL3 and ML3 may be used, or the maximum or minimum value of the angles θ1, θ2, and θ3 may be used.

The degree of deviation may be, for example, the degree (magnitude) of the difference in the amount of change in the curvature of the demarcation lines, instead of (or in addition to) the amount of lateral deviation or the angle formed by demarcation lines described above. The amount of change in the curvature is mainly used when the lane is a curved road. The determiner 142 may use the average value of the difference in curvature change between the demarcation lines CL1 and ML1, the difference in curvature change between the demarcation lines CL2 and ML2, and the difference between the demarcation lines CL3 and ML3, or may use the maximum or minimum of the differences. The determiner 142 may use the difference between the average value of the amounts of changes in the curvatures of the demarcation lines CL1 to CL3 and the average value of the amounts of changes in the curvatures of the demarcation lines ML1 to ML3. The difference between the amount of change in the curvature of lanes (lanes L1 and L2) recognized from the camera image and the amount of change in the curvature of the lanes recognized from the map information may be used.

Here, in the embodiment, the determiner 142 varies the manner of determining whether or not there is a deviation between camera demarcation lines and map demarcation lines between a case in which neighboring vehicles have been recognized by the first recognizer 132 and a case in which the neighboring vehicles have not been recognized. "Varying the manner of determination" means, for example, varying various determination conditions, such as varying the threshold value used in deviation determination or varying the cycle of determination processing. The determiner 142 may vary the manner of determination described above when an adjacent vehicle is included in recognized neighboring vehicles. When an adjacent vehicle is present, the manner of determination may be varied such that interference (contact) between the subject vehicle M and the adjacent vehicle can be curbed earlier, thereby realizing more appropriate deviation determination and driving control based on the determination result.

The determiner 142 may determine whether or not demarcation lines (e.g., camera demarcation lines) that demarcate the lane in which the subject vehicle M is traveling are correct demarcation lines on the basis of the result of determination of whether or not there is a deviation. The determiner 142 may determine whether or not the lane demarcated by the demarcation lines is correct, instead of (or in addition to) determining whether or not the demarcation lines are correct. If it is determined that the demarcation lines are correct, the execution controller 144 generates a target trajectory such that the subject vehicle M travels along the correct demarcation lines, and the second controller 160 executes driving control (travel control) of the subject vehicle M based on the target trajectory.

For example, when the first recognizer 132 recognizes neighboring vehicles and the recognized neighboring vehicles include an adjacent vehicle, the determiner 142 performs deviation determination on the basis of the driving trajectory of a neighboring vehicle other than the adjacent vehicle and located ahead (preceding in the travel direction) of the adjacent vehicle (or the subject vehicle M) and the map demarcation lines. When an adjacent vehicle is recognized, it is possible to perform deviation determination even when distant camera demarcation lines cannot be recognized by comparing the driving trajectory of the neighboring vehicle (e.g., preceding vehicle) other than the adjacent vehicle with the map demarcation lines. This makes it possible to perform driving control early to prevent interference between the subject vehicle M and the adjacent vehicle on the basis of prediction that the adjacent vehicle will also travel along the driving trajectory of the preceding vehicle and to more reliably curb interference.

For example, as in the scene shown in FIG. 3, when the recognition range (range in which recognition accuracy is equal to or greater than a threshold value) of the camera demarcation lines CL1 to CL3 ahead of the subject vehicle M by the first recognizer 132 is a point P1 shown in FIG. 3, the subject vehicle M cannot recognize the camera demarcation lines beyond the point (farther than the point P1 as viewed from the subject vehicle M). In this case, the determiner 142 treats driving trajectories K2 and K3 of the other vehicles m2 and m3 present farther than the point P1, among driving trajectories of the neighboring vehicles recognized by the first recognizer 132 (driving trajectories K1 to K3 of the other vehicles m1 to m3 shown in FIG. 3), as equal to the camera demarcation lines and compares the same with the map demarcation lines ML to determine whether there is a deviation. In determining whether or not there is a deviation, the determiner 142 derives deviation degrees on the basis of, for example, angles θa and θb formed by the extension direction of the map demarcation lines ML1 to ML3 and the extension direction of the driving trajectories K2 and K3 (which may be replaced with "deviation angles of the driving trajectories K2 and K3 with respect to the extension direction of the map demarcation lines ML1 to ML3"), determines that there is a deviation between the demarcation lines when at least one of the derived deviation degrees or an average value of the deviation degrees is equal to or greater than a threshold value, and determines that there is no deviation when the deviation degrees are less than the threshold value. If the determiner 142 determines that there is a deviation under the aforementioned conditions, the determiner 142 may determine that the camera demarcation lines CL1 and CL2 are correct demarcation lines.

The conditions for determining that the camera demarcation lines CL1 and CL2 are correct demarcation lines may include, for example, a condition that there is no deviation between the driving trajectory K1 of the other vehicle m1 that is an adjacent vehicle and the camera demarcation lines CL1 and CL2. A point at which the determiner 142 can determine a deviation further away than the point P1 may be, for example, a point P2 based on the end (far end) of the driving trajectory (the driving trajectory K2 of the other vehicle m2 in the example of FIG. 3) of the neighboring vehicle that is present at the farthest position from the subject vehicle M (or the other vehicle m1 that is an adjacent vehicle), recognized by the subject vehicle M, or may be a point a predetermined distance away from the point P1. Accordingly, by limiting the range in this way, erroneous determinations at a distance can be curbed.

Figure 4:
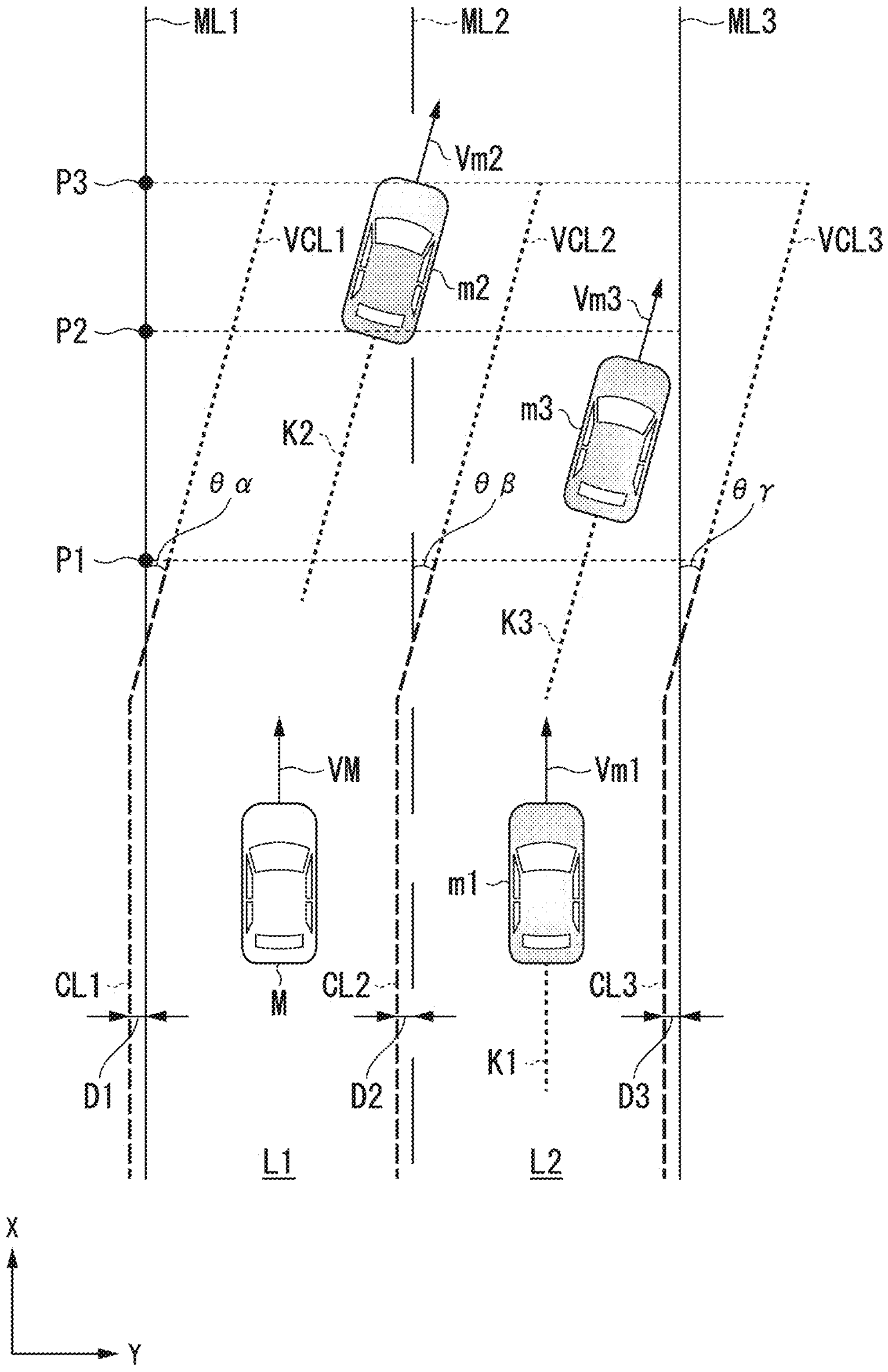
FIG. 4 is a diagram illustrating the content of determination using virtual camera demarcation lines.

The determiner 142 may set virtual camera demarcation lines (virtual camera demarcation lines and virtual first demarcation lines) using the driving trajectories K2 and K3 instead of the driving trajectories K2 and K3 of the other vehicles m2 and m3, and compare the set virtual camera demarcation lines with the map demarcation lines to determine a deviation or to determine whether or not the camera demarcation lines are correct demarcation lines. FIG. 4 is a diagram illustrating the content of determination using the virtual camera demarcation lines. FIG. 4 shows a scene similar to the first scene shown in FIG. 3. In the example of FIG. 4, the determiner 142 sets virtual camera demarcation lines VCL1 to VCL3 that are extended from the end (point P1) of the camera demarcation lines CL1 to CL3 recognized by the first recognizer 132 in parallel to the extension direction of the driving trajectories K2 and K3 of the other vehicles m2 and m3 that exist farther away than the point P1. The length of the virtual camera demarcation lines VCL1 to VCL3 is set, for example, on the basis of the position of the driving trajectory of the preceding vehicle. When the point P1 is set as the start point of the virtual camera demarcation lines VCL1 to VCL3, the end point may be the point P2 based on the end (far end) of the driving trajectory K2 of the other vehicle m2 present at the farthest position from the subject vehicle M (or the other vehicle m1), recognized by the subject vehicle M, or may be a point P3 with a predetermined length added thereto. The length of the virtual camera demarcation lines VCL1 to VCL3 may be a predetermined fixed length. By limiting the range in this way, erroneous determinations at a distance can be curbed.

Then, the determiner 142 regards the set virtual camera demarcation lines VCL1 to VCL3 as camera demarcation lines, compares the same with the map demarcation lines ML1 to ML3, and determines whether there is a deviation. In the example of FIG. 4, the determiner 142 obtains the angles θα, θβ, and θγ formed by the extension directions of the map demarcation lines ML1 to ML3 and the extension directions of the virtual camera demarcation lines VCL1 to VCL3, derives deviation degrees using the obtained angles θα, θβ, and θγ, and performs deviation determination on the basis of the derived deviation degrees and the threshold value. The deviation degrees at this time are derived, for example, on the basis of the average value, maximum value, minimum value, or the like of the angles θα, θβ, and θγ.

Accordingly, even if the camera demarcation lines cannot be directly recognized, deviation determination can be performed by comparing virtually set camera demarcation lines on the basis of the driving trajectories of neighboring vehicles with the map demarcation lines. Therefore, it is possible to curb immediate determination that the camera demarcation lines are incorrect because the camera demarcation lines cannot be recognized, and it is possible to continue driving control to cause the subject vehicle M to travel along either the camera demarcation lines or the map demarcation lines.

At a short distance (e.g., less than a predetermined distance) from the subject vehicle M, the determiner 142 determines deviations between camera demarcation lines and road demarcation lines even if a neighboring vehicle (e.g., an adjacent vehicle) is present at a short distance. On the other hand, the determiner 142 performs deviation determination on the basis of the driving trajectory of a neighboring vehicle present far ahead of the adjacent vehicle (or the subject vehicle M) and the map demarcation lines at a long distance (e.g., equal to or greater than the predetermined distance) from the subject vehicle M, as shown in FIG. 3. The predetermined distance may be a fixed distance determined in advance, or may be a variable distance depending on the speed VM of the subject vehicle M, the road shape, the recognition range of the camera demarcation lines, and the like. The determiner 142 may perform deviation determination on the basis of the virtual camera demarcation lines and the map demarcation lines at a long distance from the subject vehicle M, as shown in FIG. 4. This allows smooth switching of the determination conditions between short distance and long distance.

When neighboring vehicles include an adjacent vehicle, the determiner 142 may reset the deviation determination result when the neighboring vehicles no longer include an adjacent vehicle (an adjacent vehicle is no longer recognized by the first recognizer 132) after determining that there is not deviation between the camera demarcation lines and the map demarcation lines by the deviation determination based on the above-described method shown in FIG. 3 and FIG. 4. The method shown in FIG. 3 and FIG. 4 aims to perform deviation determination and correct/incorrect determination of demarcation lines early in order to curb interference between the subject vehicle M and the adjacent vehicle (other vehicle m1), and thus deviation determination result is reset when there is no adjacent vehicle. In this case, the determiner 142 newly performs deviation determination on the basis of the current situation, or performs determination of a deviation from the map demarcation lines within a range in which the camera demarcation lines can be recognized. Accordingly, it is possible to realize more appropriate determination processing depending on the surrounding situation.

In the embodiment, when the first recognizer 132 recognizes neighboring vehicles, the determiner 142 makes it easier to determine that demarcation lines deviate by reducing the threshold value (threshold value to be compared with deviation degrees) used for deviation determination, compared to a case in which no neighboring vehicles are recognized. Accordingly, when neighboring vehicles are present, the result of demarcation line deviation determination can be obtained early, and driving control being executed by the subject vehicle M can be switched. Therefore, interference (contact) between the subject vehicle M and the neighboring vehicles can be more appropriately curbed. In a case in which neighboring vehicles are recognized, the determiner 142 may perform deviation determination at a faster cycle than a case in which no neighboring vehicles are recognized. Accordingly, it is possible to perform determination under a situation closer to the current situation, and driving control being executed by the subject vehicle M can be switched early depending on the situation, and thus interference between the subject vehicle M and the neighboring vehicles can be more appropriately curbed. The above-described "a case in which neighboring vehicles are recognized" may be replaced with "a case in which when neighboring vehicles include an adjacent vehicle" and "a case in which no neighboring vehicles are recognized" may be replaced with "a case in which neighboring vehicles do not include an adjacent vehicle (or there is no adjacent vehicle)."

When no neighboring vehicles are recognized, the determiner 142 performs determination of a deviation from the map demarcation lines within a range in which the camera demarcation lines can be recognized, without performing deviation determination using the driving trajectories of neighboring vehicles as shown in FIG. 3 and FIG. 4.

The execution controller 144 determines driving control for the subject vehicle M on the basis of the determination result of the determiner 142 and executes the determined driving control. "Determining driving control" may include, for example, determining the content (type) of driving control and determining whether or not to execute (curb) driving control. "Executing driving control" may include, for example, continuing driving control that is already being executed, in addition to switching and executing the content of driving control. Curbing driving control may include not only not executing (or terminating) driving control, but also lowering the automation level of driving control. Driving control executed by the execution controller 144 may include ACC, TJP, LKAS, ALC, CMBS, and the like, and may also include various types of driving control for avoiding contact with neighboring vehicles. The execution controller 144 generates a target trajectory for executing driving control and outputs the generated target trajectory to the second controller 160.

Here, in the first scene, driving control executed by the execution controller 144 includes at least first driving control and second driving control. The first driving control is, for example, driving control for executing control of at least steering of the steering and speed of the subject vehicle M on the basis of demarcation lines (for example, demarcation lines of a part that does not deviate from the camera demarcation lines and the map demarcation lines) recognized by the first recognizer 132 or the second recognizer 134. For example, the first driving control is driving control for causing the subject vehicle M to travel such that the representative point of the subject vehicle M passes through the center of a lane demarcated by demarcation lines. The second driving control is, for example, driving control for executing control of at least steering of the steering and speed of the subject vehicle M on the basis of camera demarcation lines recognized by the first recognizer 132 and driving position information of other vehicles. The second driving control is, for example, driving control for causing the subject vehicle M to travel such that the representative point of the subject vehicle M travels on a trajectory along the driving trajectory of the other vehicle m1.

Furthermore, driving control may include third driving control for executing control of at least steering of the steering or speed of the subject vehicle M, giving priority to the camera demarcation lines over the map demarcation lines, and a fourth driving control for executing control of at least steering of the steering or speed of the subject vehicle M, giving priority to the map demarcation lines over the camera demarcation lines. Giving priority to the camera demarcation lines over the map demarcation lines means, for example, that processing based on the camera demarcation lines is basically performed, but when the recognition accuracy of the camera demarcation lines becomes lower than a threshold value or the camera demarcation lines cannot be recognized, for example, the processing is temporarily switched to processing based on the map demarcation lines. Giving priority to the map demarcation lines over the camera demarcation lines means that processing based on the map demarcation lines is basically performed, but the processing is temporarily switched to processing based on the camera demarcation lines when the map demarcation lines cannot be identified, for example. The third driving control and the fourth driving control are driving controls when, for example, the camera demarcation lines and the map demarcation lines deviate from each other.

Driving control may include a plurality of driving controls based on an automation level (an example of a degree of automation). The automation level includes, for example, a first level, a second level having a lower degree of automation of driving control than the first level, and a third level having a lower degree of automation of driving control than the second level. The automation level may include a fourth level (an example of a fourth control degree) having a lower degree of automation of driving control than the third level. Here, the automation level may be a level defined by standardized information, laws, or the like, or may be an index value set independently of the above. Therefore, the types, content, and number of automation levels are not limited to the following examples. For example, a low degree of automation of driving control means that the automation rate in driving control is low and tasks assigned to the driver are large (severe). A low automation of driving control means that the automated driving control device 100 controls the steering or acceleration/deceleration of the subject vehicle M to a low degree (the driver has a high degree of need to intervene in the steering or acceleration/deceleration operation). The tasks assigned to the driver include, for example, monitoring the surroundings of the subject vehicle M, operating driving operators, and the like. The operation of driving operators includes, for example, a state in which the driver grips the steering wheel (hereinafter, referred to as a hands-on state). The tasks assigned to the driver include, for example, a task (driver task) for an occupant that is necessary to maintain automated driving of the subject vehicle M. Therefore, if the occupant cannot execute assigned tasks, the automation level will be lowered. For example, the first level of driving control may include, for example, driving control such as ACC, ALC, LKAS, and TJP. The second or third level of driving control may include, for example, driving control such as ACC, ALC, and LKAS. The fourth level of driving control may include manual driving. The fourth level of driving control may include, for example, driving control such as ACC. Among the first to fourth levels, the first level has the highest degree of automation of driving control, and the fourth level has the lowest degree of automation of driving control.

At the first level, no tasks are assigned to the occupant (a lightest task is assigned to the driver). At the second level, tasks assigned to the occupant include, for example, monitoring the surroundings (particularly the front) of the subject vehicle M. At the third level, tasks assigned to the occupant include, for example, being in a hands-on state in addition to monitoring the surroundings of the subject vehicle M. At the fourth level, tasks assigned to the occupant (for example, the driver) include, for example, operating the driving operator 80 to control the steering and speed of the subject vehicle M in addition to monitoring the surroundings of the subject vehicle M and being in a hands-on state. That is, in the case of the fourth level, the occupant is ready to take over driving immediately, and the driver has the most severe task. The content of driving control and tasks assigned to the occupant at each automation level are not limited to the above-described examples. The automated driving control device 100 executes driving control at any one of the first to fourth levels on the basis of the surrounding situation of the subject vehicle M and tasks being performed by the occupant. At least some of the first to fourth levels may be associated with the above-described first to fourth driving controls, for example.

For example, the execution controller 144 executes the first driving control when the determiner 142 determines that there is no deviation between the camera demarcation lines and the map demarcation lines, and executes one of the second to fourth driving controls depending on the situation when the determiner 142 determines that there is a deviation between the camera demarcation lines and the map demarcation lines. The execution controller 144 may execute control such as terminating driving control of the subject vehicle M and switching to manual driving by the occupant on the basis of the determination result. Furthermore, the execution controller 144 may switch the automation level corresponding to driving control on the basis of the determination result. In this case, when it is determined that there is not deviation between the camera demarcation lines and the map demarcation lines, for example, the first or second level driving control is executed, and when it is determined that there is no deviation, the third or fourth level driving control is executed depending on the situation.

Second Scene

Figure 5:
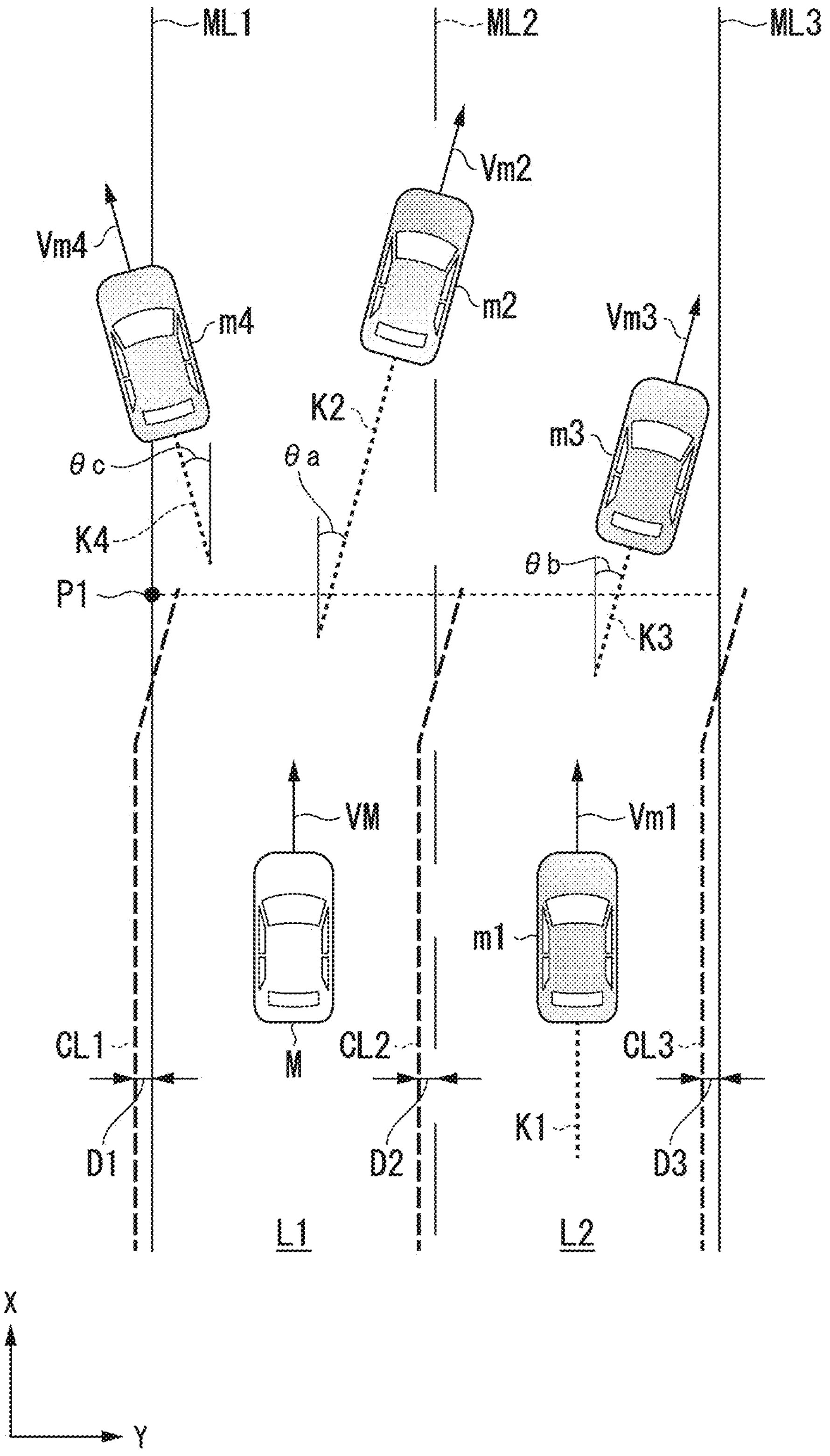
FIG. 5 is a diagram illustrating determination processing and driving control of the subject vehicle Min a second scene.

FIG. 5 is a diagram illustrating determination processing and driving control of the subject vehicle M in the second scene. The example of FIG. 5 is different from the example of FIG. 3 described above in that there is another vehicle (neighboring vehicle) m4 traveling in front of the subject vehicle M at a speed Vm4 in addition to the other vehicles m1 to m3. In the second scene, the first recognizer 132 recognizes the positions, speeds, traveling lanes, vehicle body orientations, traveling directions, and driving trajectories K1 to K4 of the other vehicles m1 to m4 present in the vicinity of the subject vehicle M. The determiner 142 performs deviation determination using the map demarcation lines ML1 to ML3 and the driving trajectories K1 to K4 of the other vehicles m1 to m4. In this case, the determiner 142 performs deviation determination using, for example, a driving trajectory in which the deviation angles of the driving trajectories K1 to K4 with respect to the extension direction of the map demarcation lines ML1 to ML3 are equal to or greater than a predetermined angle. The predetermined angle may be a fixed angle or a variable angle depending on the road shape and the like.

In the example of FIG. 5, among the other vehicles m1 to m4, the deviation angles θa to θc of the other vehicles m2 to m4 are equal to or greater than the predetermined angle, and thus deviation determination is performed on the driving trajectories K2 to K4 of the other vehicles m2 to m4 as the target driving trajectories. Since other vehicles whose driving trajectories have deviation angles with respect to the map demarcation lines that are less than the predetermined angle are expected to be unlikely to approach the subject vehicle M, processing efficiency can be improved by excluding driving trajectories whose deviation angles are less than the predetermined angle from deviation determination targets.

In the second scene, the determiner 142 may acquire the deviation directions of the driving trajectories K1 to K4 with respect to the extension direction of the map demarcation lines, compare the acquired deviation directions, and performs determination of a deviation from the map demarcation lines using driving trajectory with a greater number of identical deviation directions. In the example of FIG. 5, the deviation directions of the driving trajectories K2 and K3 are to the right, and the deviation direction of the driving trajectory K4 is to the left, with respect to the extension direction of the map demarcation lines ML1 to ML3. Therefore, the determiner 142 performs determination of a deviation from the map demarcation lines ML1 to ML3 using the driving trajectories K2 and K3 that deviate to the right, which is the direction in which the number is greater. This makes it possible to exclude other vehicles that deviate in the opposite direction to avoid obstacles or change lanes, and thus makes it possible to perform more appropriate deviation determination based on driving trajectories and map demarcation lines.

The determiner 142 may not perform determination of a deviation between a driving trajectory and the map demarcation lines when the number of driving trajectories with the same deviation direction is the same in a plurality of different directions. For example, when the number of driving trajectories deviating to the right with respect to the extension direction of the map demarcation lines is the same as the number of driving trajectories deviating to the left, the determiner 142 does not perform deviation determination using the driving trajectories. When there are the same number of driving trajectories deviating to the left and right, it is difficult to determine which one is correct, and thus when there are the same number of driving trajectories, deviation determination using the driving trajectories is not performed, thereby curbing erroneous determination. Processing in the second scene may be performed only when, for example, neighboring vehicles recognized by the first recognizer 132 include both a preceding vehicle and an adjacent vehicle.

Processing Flow

Figure 6:
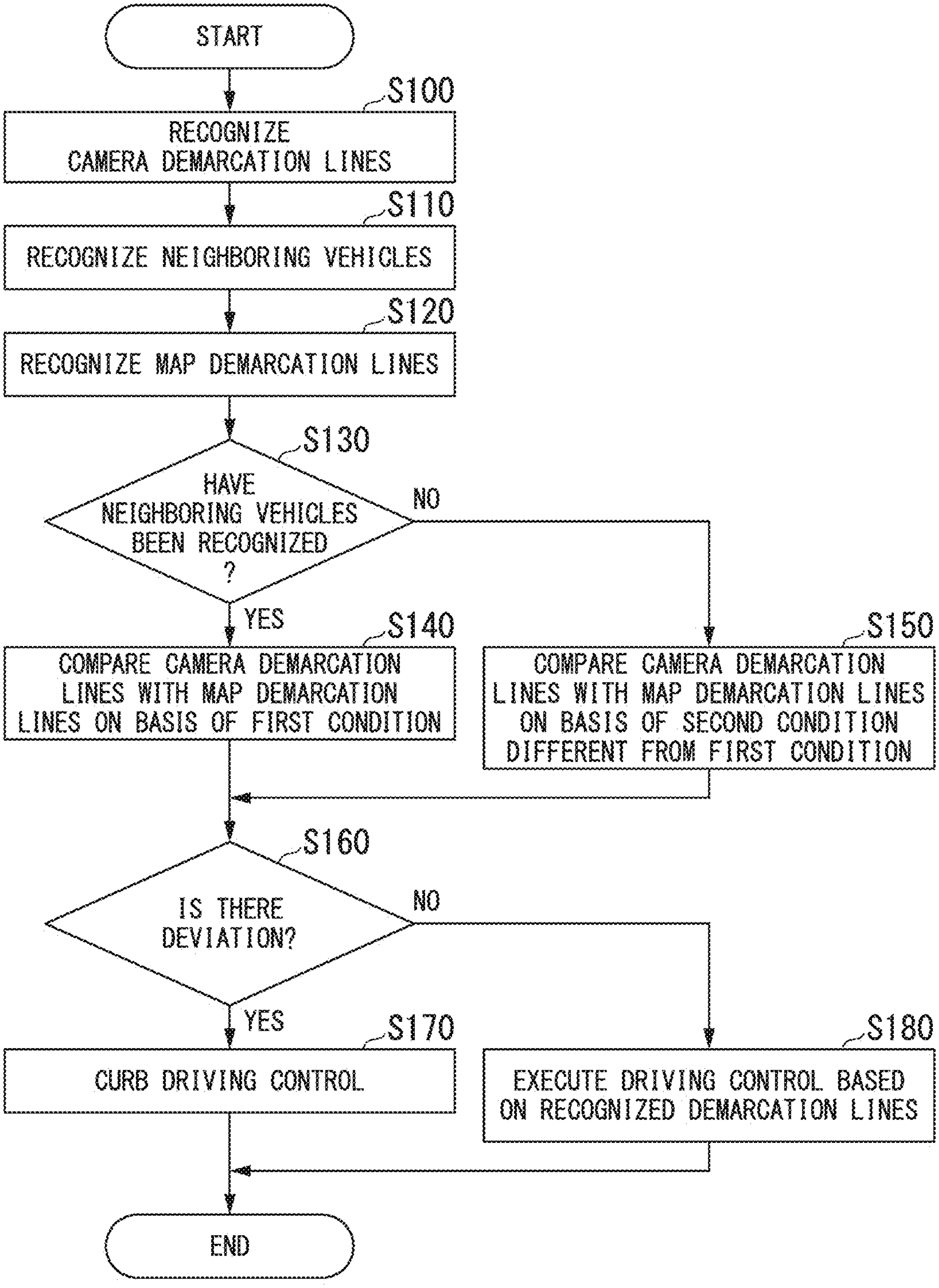
FIG. 6 is a flowchart showing an example of processing executed by an automated driving control device of an embodiment.

Hereinafter, processing executed by the automated driving control device 100 of the embodiment will be described. FIG. 6 is a flowchart showing an example of processing executed by the automated driving control device 100 of the embodiment. The following mainly describes processing executed by the automated driving control device 100, focusing on processing for determining a deviation between the map demarcation lines and the camera demarcation lines and driving control processing based on the determination result. At the start of the flow, the subject vehicle M is assumed to be performing a predetermined driving control on the basis of the surrounding situation and instructions from the occupant. The processing shown below may be repeatedly performed at a predetermined timing or at a predetermined cycle, and may be repeatedly performed while automated driving by the automated driving control device 100 is being performed.

In the example of FIG. 6, the first recognizer 132 recognizes demarcation lines (camera demarcation lines) present around the subject vehicle M on the basis of the output of the detection device DD that detects the surrounding situation of the subject vehicle M (step S100). Next, the first recognizer 132 recognizes neighboring vehicles present around the subject vehicle M (step S110). Next, the second recognizer 134 refers to map information on the basis of the position information of the subject vehicle M, and recognizes demarcation lines (map demarcation lines) present around the subject vehicle M from the map information (step S120).

Next, the determiner 142 determines whether or not a neighboring vehicle has been recognized by the first recognizer 132 (step S130). If it is determined that a neighboring vehicle has been recognized, the determiner 142 compares the camera demarcation lines with the map demarcation lines on the basis of a first condition (step S140). If it is determined by the processing of step S130 that no neighboring vehicle has been recognized, the determiner 142 compares the camera demarcation lines with the map demarcation lines on the basis of a second condition different from the first condition (step S150). That is, the determiner 142 varies the manner of determination of whether or not there is a deviation between the camera demarcation lines and the map demarcation lines depending on whether or not a neighboring vehicle has been recognized.

Next, the determiner 142 determines whether or not there is a deviation between the camera demarcation lines and the map demarcation lines by the processing of step S140 or S150 (step S160). If it is determined that there is a deviation, the execution controller 144 curbs driving control of the subject vehicle M (step S170). Curbing driving control includes, for example, switching driving control being executed (for example, switching from the first driving control to the third driving control or the fourth driving control), terminating (or not starting) driving control being executed, and lowering the automation level of driving control. If it is determined that there is no deviation in the processing of step S160, the execution controller 144 executes driving control based on at least one side of the camera demarcation lines recognized by the first recognizer 132 and the map demarcation lines recognized by the second recognizer 134 (or continues driving control being executed) (step S180). Accordingly, processing of this flowchart ends.

According to the above-described embodiment, the determination device (the recognizer 130 and the determiner 142) includes the first recognizer 132 that recognizes the surrounding situation including camera demarcation lines (an example of first demarcation lines) that demarcate the driving lane of the subject vehicle M and neighboring vehicles present around the subject vehicle M on the basis of the output of the detection device that detects the surrounding situation of the subject vehicle M, the second recognizer 134 that recognizes map demarcation lines (second demarcation lines) that demarcate lanes around the subject vehicle M from map information on the basis of the position information of the subject vehicle M, and the determiner 142 that determines whether or not there is a deviation between the camera demarcation lines and the map demarcation lines, and the determiner 142 can more appropriately determine whether or not demarcation lines are correct depending on situations of road demarcation lines around the subject vehicle and neighboring vehicles by varying the manner of determining whether or not there is a deviation between the camera demarcation lines and the map demarcation lines between a case in which neighboring vehicles have been recognized by the first recognizer 132 and a case in which the neighboring vehicles have not been recognized. Therefore, according to the embodiment, it is possible to further improve the continuity of driving control, which can contribute to development of a sustainable transportation system.

According to the embodiment, when there is an adjacent vehicle around the subject vehicle M, for example, it is possible to determine whether or not there is a deviation from map demarcation lines and camera demarcation lines are correct early using a driving trajectory of a neighboring vehicle traveling ahead of the subject vehicle M or the adjacent vehicle. Therefore, interference (contact) between the subject vehicle M and the adjacent vehicle can be curbed, and more appropriate driving control can be performed.

The embodiment described above can be represented as follows.

A determination device including:

a storage medium storing computer-readable instructions; and a processor connected to the storage medium, the processor executing the computer-readable instructions to:

recognize a surrounding situation including a first demarcation lines that demarcate a traveling lane of a subject vehicle and a neighboring vehicle present around the subject vehicle on the basis of an output of a detection device that detects the surrounding situation of the subject vehicle;

recognize second demarcation lines that demarcate lanes around the subject vehicle from map information on the basis of position information of the subject vehicle;

determine whether or not there is a deviation between the first demarcation lines and the second demarcation lines; and vary the manner of determining whether or not there is a deviation between the first demarcation lines and the second demarcation lines between a case in which the neighboring vehicle has been recognized and a case in which the neighboring vehicle has not been recognized.

Although the form for carrying out the present invention has been described above using an embodiment, the present invention is not limited to such an embodiment, and various modifications and substitutions can be made within the scope that does not deviate from the gist of the present invention.

What is claimed is:

1. A determination device comprising:

a processor that executes instructions to:

recognize a surrounding situation including first demarcation lines that demarcate a traveling lane of a subject vehicle and neighboring vehicles present around the subject vehicle on the basis of an output of a detection device that detects the surrounding situation of the subject vehicle;

recognize second demarcation lines that demarcate lanes around the subject vehicle from map information on the basis of position information of the subject vehicle; and perform a deviation determination that determines whether or not there is a deviation between the first demarcation lines and the second demarcation lines, wherein the processor varies the manner of determining whether or not there is a deviation between the first demarcation lines and the second demarcation lines between a case in which the neighboring vehicles have been recognized and a case in which the neighboring vehicles have not been recognized, wherein the processor determines that there is a deviation between the first demarcation lines and the second demarcation lines when a deviation degrees of between the first demarcation lines and the second demarcation lines are equal to or greater than a threshold value, and determines that there is no deviation the first demarcation lines and the second demarcation lines when the deviation degrees are less than the threshold value, and wherein varying the manner of determination includes at least one of a following: varying the threshold value used in the deviation determination or varying the cycle of the deviation determination.

2. The determination device according to claim 1, wherein the neighboring vehicles include an adjacent vehicle traveling in an adjacent lane adjacent to the lane in which the subject vehicle is traveling and present within a predetermined distance from the subject vehicle, and wherein the processor varies the manner of the determination when the neighboring vehicles include an adjacent vehicle.

3. The determination device according to claim 1, wherein the processor is more likely to determine that there is a deviation between the first demarcation lines and the second demarcation lines when the neighboring vehicles have been recognized than when the neighboring vehicles have not been recognized.

4. The determination device according to claim 2, wherein, when the neighboring vehicles have been recognized the processor determines whether or not there is a deviation between the first demarcation lines and the second demarcation lines on the basis of a driving trajectory of a neighboring vehicle other than the adjacent vehicle among the recognized neighboring vehicles and present ahead of the adjacent vehicle in a traveling direction, and the second demarcation lines.

5. The determination device according to claim 4, wherein the processor sets virtual first demarcation lines from the driving trajectory of the neighboring vehicle and determines whether or not there is a deviation between the set virtual first demarcation lines and the second demarcation lines.

6. The determination device according to claim 2, wherein, when the neighboring vehicles have been recognized, the processor determines whether or not there is a deviation between the first demarcation lines and the second demarcation lines at a position less than a predetermined distance from the subject vehicle, and determines whether or not there is a deviation between the second demarcation lines and a driving trajectory of a neighboring vehicle other than an adjacent vehicle among the neighboring vehicles and ahead of the adjacent vehicle at a position equal to or greater than the predetermined distance from the subject vehicle.

7. The determination device according to claim 5, wherein the processor determines whether or not there is a deviation between the virtual first demarcation lines and the second demarcation lines at a position equal to or greater than the predetermined distance from the subject vehicle.

8. The determination device according to claim 2, wherein, after determining whether or not there is a deviation between the first demarcation lines and the second demarcation lines using the neighboring vehicles, the processor resets a result of determination of whether there is a deviation when the processor no longer recognizes the adjacent vehicle.

9. The determination device according to claim 4, wherein the processor acquires a driving trajectory of a neighboring vehicle in which a deviation angle of the driving trajectory with respect to an extension direction of the second demarcation lines is equal to or greater than a predetermined angle, and determines whether or not there is a deviation between the acquired driving trajectory and the second demarcation lines.

10. The determination device according to claim 4, wherein the processor acquires deviation directions of driving trajectories of the neighboring vehicles with respect to an extension direction of the second demarcation lines, and determines whether or not there is a deviation between a driving trajectory with a greater number of identical deviation directions and the second demarcation lines.

11. The determination device according to claim 4, wherein the processor acquires deviation directions of driving trajectories of the neighboring vehicles with respect to an extension direction of the second demarcation lines, and does not determine whether or not there is a deviation between the driving trajectories of the neighboring vehicles and the second demarcation lines if a number of driving trajectories with the same deviation direction is identical in a plurality of different directions.

12. A determination method, using a computer, comprising:

recognizing a surrounding situation including first demarcation lines that demarcate a traveling lane of a subject vehicle and neighboring vehicles present around the subject vehicle on the basis of an output of a detection device that detects the surrounding situation of the subject vehicle;

recognizing second demarcation lines that demarcate lanes around the subject vehicle from map information on the basis of position information of the subject vehicle;

performing a deviation determination that determines whether or not there is a deviation between the first demarcation lines and the second demarcation lines;

varying the manner of determining whether or not there is a deviation between the first demarcation lines and the second demarcation lines between a case in which the neighboring vehicles have been recognized and a case in which the neighboring vehicles have not been recognized;

determining that there is a deviation between the first demarcation lines and the second demarcation lines when a deviation degrees of between the first demarcation lines and the second demarcation lines are equal to or greater than a threshold value, and determining that there is no deviation the first demarcation lines and the second demarcation lines when the deviation degrees are less than the threshold value; and varying the manner of determination includes at least one of a following: varying the threshold value used in the deviation determination or varying the cycle of the deviation determination.

13. A computer-readable non-transitory storage medium storing a program of causing a computer to:

recognize a surrounding situation including first demarcation lines that demarcate a traveling lane of a subject vehicle and neighboring vehicles present around the subject vehicle on the basis of an output of a detection device that detects the surrounding situation of the subject vehicle;

recognize second demarcation lines that demarcate lanes around the subject vehicle from map information on the basis of position information of the subject vehicle;

perform a deviation determination that determines whether or not there is a deviation between the first demarcation lines and the second demarcation lines;

vary the manner of determining whether or not there is a deviation between the first demarcation lines and the second demarcation lines between a case in which the neighboring vehicles have been recognized and a case in which the neighboring vehicles have not been recognized;

determine that there is a deviation between the first demarcation lines and the second demarcation lines when a deviation degrees of between the first demarcation lines and the second demarcation lines are equal to or greater than a threshold value, and determine that there is no deviation the first demarcation lines and the second demarcation lines when the deviation degrees are less than the threshold value; and varying the manner of determination includes at least one of a following: varying the threshold value used in the deviation determination or varying the cycle of the deviation determination.

* * * * *